US007368711B2

(12) United States Patent
Franzen et al.

(10) Patent No.: US 7,368,711 B2
(45) Date of Patent: May 6, 2008

(54) MEASURING CELL FOR ION CYCLOTRON RESONANCE MASS SPECTROMETER

(75) Inventors: Jochen Franzen, Bremen (DE); Evgenij Nikolaev, Moscow (RU)

(73) Assignee: Bruker Daltonik GmbH, Bremen (DE)

( * ) Notice: Subject to any disclaimer, the term of this patent is extended or adjusted under 35 U.S.C. 154(b) by 271 days.

(21) Appl. No.: 11/197,129

(22) Filed: Aug. 4, 2005

(65) Prior Publication Data

US 2006/0027743 A1 Feb. 9, 2006

(30) Foreign Application Priority Data

Aug. 9, 2004 (DE) ...................... 10 2004 038 661

(51) Int. Cl.
*B01D 59/44* (2006.01)

(52) U.S. Cl. ....................... 250/291; 250/293; 250/292

(58) Field of Classification Search ................ 250/291
See application file for complete search history.

(56) References Cited

U.S. PATENT DOCUMENTS 4,931,640 A 6/1990 Marshall et al.
5,019,706 A * 5/1991 Allemann et al. .......... 250/291
5,572,035 A 11/1996 Franzen
6,403,955 B1 6/2002 Senko
7,223,965 B2 * 5/2007 Davis ......................... 250/282

FOREIGN PATENT DOCUMENTS

| | | | |
|---|---|---|---|
| DE | 39 14 838 | A1 | 5/1989 |
| GB | 2 302 985 | A | 6/1996 |
| SU | 1684831 | A2 | 8/1989 |

* cited by examiner

*Primary Examiner*—Jack I. Berman
*Assistant Examiner*—Andrew Smyth
(74) *Attorney, Agent, or Firm*—Law Offices of Paul E. Kudirka

(57) ABSTRACT

The invention relates to a measuring cell for an ion cyclotron resonance mass spectrometer (FTMS). The invention provides a measuring cell which, on the one hand, consists of two ion-repelling RF grids at the front ends as trapping electrodes and thus produces a pure cyclotron motion of the ions without the usually co-existing magnetron motion and, on the other hand, measures a multiplied cyclotron frequency by means of a plurality of detection electrodes, whereby either a higher mass accuracy or a shorter measuring time can be achieved.

11 Claims, 5 Drawing Sheets

MEASURING CELL FOR ION CYCLOTRON RESONANCE MASS SPECTROMETER

FIELD OF THE INVENTION

The invention relates to a measuring cell for an ion cyclotron resonance mass spectrometer (FTMS).

BACKGROUND OF THE INVENTION

In ion cyclotron resonance mass spectrometers (ICR-MS), the mass-to-charge ratios m/z of ions are measured by their cyclotron movements in a homogeneous magnetic field with high field strength. The magnetic field is usually generated by superconductive magnetic coils cooled in liquid helium. Nowadays, they provide usable cell diameters of around 6 to 12 centimeters at magnetic field strengths of 7 to 12 Tesla.

The orbital frequency of the ions (ion cyclotron frequency) is measured in ICR measuring cells located within the homogeneous part of the magnetic field. The ICR measuring cells normally comprise four longitudinal electrodes which extend in a cylindrical arrangement parallel to the magnetic field lines and surround the measuring cell like a sliced sleeve. Usually, two of these electrodes are used to bring ions, introduced close to the axis, into their cyclotron orbits (into their cyclotron motion), ions with the same mass-to-charge ratio being excited as in phase as possible in order to obtain a synchronously orbiting cloud of ions. The two other electrodes serve to measure the orbiting of the ion clouds by their image currents, which are induced in the electrodes as the ions fly past. The term "image currents" is normally used even though it is actually the induced "image voltages" which are measured. The processes of introducing the ions into the measuring cell, ion excitation and ion detection are carried out in successive steps of the method.

Since the mass-to-charge ratio of the ions (referred to below simply as "specific mass", and sometimes simply as "mass") before the measurement is unknown, the ions are excited by a complete and homogeneous mixture of excitation frequencies. This mixture can be a temporal mixture with frequencies increasing with time (called a "chirp"), or it can be a synchronous, computer-calculated mixture of all frequencies (a "sync pulse"). By specially selecting the phases, the synchronous mixture of the frequencies can be formed so that the amplitudes of the mixture remain restricted to the dynamic region of the digital-to-analog converter, which produces the temporal analog voltage sequence characteristics for the mixture.

The image currents induced by the ions in the detection electrodes are amplified, digitized and analyzed by Fourier analysis for the orbital frequencies present therein. The Fourier analysis transforms the original measurements in the "time domain" into a "frequency domain", hence the term Fourier transform mass spectrometry (FTMS). The specific masses of the ions and their intensities are then determined from the signals, which can be recognized as peaks in the frequency domain. Owing to the extraordinarily high constancy of the magnetic fields used, and the high accuracy for frequency measurements, it is possible to achieve an extraordinarily accurate mass determination. At present, Fourier transform mass spectrometry is the most accurate of all types of mass spectrometry. Ultimately, the accuracy depends only on the number of ion orbits which can be detected by the measurement.

The longitudinal electrodes usually form a measuring cell with a square or circular cross-section. The cylindrical measuring cell contains four cylinder segments as longitudinal electrodes. Cylindrical measuring cells are the ones most commonly used because they produce the best utilization of the magnetic field, although the image currents of focused clouds of ions with the same mass (image voltages) come close to a rectangular curve.

Since the ions can move freely in the direction of the magnetic field lines and possess, from the filling phase, all velocity components in the direction of the magnetic field, they must be prevented from leaving the measuring cell. To prevent ion losses, the measuring cells are therefore equipped at both ends with electrodes, known as "trapping electrodes". These are supplied with ion-repelling DC voltage potentials in order to keep the ions in the measuring cell. There are widely differing forms for this electrode pair, the simplest being planar electrodes with a central aperture. The aperture serves to introduce the ions into the measuring cell.

The ion-repelling potentials form a potential well in the interior of the measuring cell, with a parabolic potential profile along the axis of the measuring cell. The potential profile is only weakly dependent on the shape of these electrodes. The potential profile along the axis is at its minimum at precisely the mid-point of the measuring cell if the ion-repelling potentials across both electrodes have the same value. The ions introduced will therefore execute oscillations in this potential well in the axial direction—so-called trapping oscillations—because they still posses kinetic energy in the axial direction from their introduction. The amplitude of the trapping oscillations depends on their kinetic energy.

The electric field outside the axis of the measuring cell is more complicated to describe. It inevitably contains field components in the radial direction which generate a second type of ion motion: magnetron circular motion. The magnetron gyration is also a circular motion about the axis of the measuring cell, but much slower than the cyclotron circular motion. The additional magnetron circular motion causes the mid-points of the cyclotron circular movements to gyrate around the axis of the measuring cell at the frequency of the magnetron motion, with the result that the trajectory of the ions describes a cycloidal motion.

The superposition of magnetron and cyclotron circular motion is an undesirable phenomenon which leads to a frequency shift in the cyclotron frequency. Furthermore, it leads to a reduction in the usable volume of the measuring cell. The measured frequency $\omega_m$ (the "reduced cyclotron frequency") amounts to $$\omega_m = \frac{\omega_c}{2} + \sqrt{\frac{\omega_c^2}{4} - \frac{\omega_t^2}{2}},$$

where $\omega_c$ is the undisturbed cyclotron frequency, and $\omega_t$ the frequency of the trapping oscillation. The trapping oscillation determines the effect of the magnetron circular motion on the cyclotron circular motion. A measuring cell without magnetron circular motion would be very advantageous because the cyclotron frequency could be directly measured and no corrections would have to be applied.

The vacuum in the measuring cell must be as good as possible because, during the measurement of the image currents, the ions should not collide with molecules of residual gas. Each collision of an ion with a molecule of residual gas brings the ion a bit out of the orbiting phase of the other ions with the same specific mass. The loss of phase homogeneity leads to a reduction in the image currents and to a continuous decrease in the signal-to-noise-ratio, which reduces the usable measuring period. The measurement period should amount to at least a few hundred milliseconds, ideally a few seconds. This requires a vacuum in the region of $10^{-7}$ to $10^{-9}$ Pascal.

Apart from the vacuum, the space charge in the ion cloud can also adversely affect the measurement. The Coulombic repulsion between the ions themselves and, above all, the elastic reflection of the ions moving in the cloud lead to a plurality of disturbances, which also lead to an expansion of the cloud. In present-day instruments, the space charge, alongside the effects of pressure, represents the greatest limitation on achieving a high mass accuracy.

For higher specific ion masses, the decrease in the cyclotron orbital frequency of the ions is inversely proportional to the mass. The resolution, however, is proportional to the number of measured orbits; it is therefore lower for ions of high specific masses than for those of low specific masses, although a high resolution and, correspondingly, a high mass accuracy is particularly desirably for ions of high masses. Since the introduction of ion cyclotron mass spectrometers, repeated attempts have been made to increase the resolution, particularly for higher specific ion masses, by using a larger number of detection electrodes to increase the frequency of the image currents in relation to the cyclotron frequency. If a total of sixteen detection electrodes are used instead of two, then the image currents are each measured sixteen times instead of two times, and the measured frequency increases by a factor of eight. It is to be expected that resolution and mass accuracy are also increased by a factor eight if measured over the same measuring time.

Unfortunately, these experiments have had only moderate success, and so they have regularly been abandoned. The reasons for the moderate success have not been adequately explained. It can be assumed that the ion clouds do not hold together well enough and that, for this reason, they cannot be brought close enough to the detection electrodes. Narrow electrodes require that the ion clouds are brought up very close to the detection electrodes, since otherwise it is scarcely possible to induce the image currents at full strength.

Recently, measuring cells for ion cyclotron resonance mass spectrometry have been elucidated in which practically no magnetron circular motion can develop. (E. Nikolaev, Lecture at the International Mass Spectrometry Conference (IMSC) in Edinburgh, September 2003). In this case, the trapping electrodes are replaced with fine electrode structures, to which an RF voltage is applied and which thus reflect ions of both polarities because of their pseudopotential if the ions possess a specific mass above a mass threshold. The mass threshold can be adjusted by the RF voltage. Electrode structures of this type have been elucidated in U.S. Pat. No. 5,572,035 (J. Franzen). The pseudopotential has a very short range of the order of magnitude of the widths of the structural elements of this electrode structure. The reflection resembles a hard reflection on a matt screen, the scattering effect of the matt screen decreasing as the angle of incidence flattens out.

An RF field around the tip of a wire decreases outwards proportional to $1/r^2$; the RF field of a long wire decreases at $1/r$, where r is the distance from the tip or axis of the wire. Both RF fields repel both positive and negative particles. The particle oscillates in the RF field. Regardless of its charge, it experiences the strongest repelling force when it is located near to the wire, i.e. at the point where the field strength is highest. It experiences the strongest attractive force when it is at the furthermost point, i.e. at the point on its oscillation path where the field strength is lowest. Integration over time results in a repulsion. This time-integrated repulsion potential is known as the "pseudopotential", sometimes also as the "effective potential" or "quasi-potential". The pseudopotential is proportional to the square of the RF field, i.e. it decreases outwards at $1/r^2$ in the case of a long wire. Moreover, the pseudopotential is inversely proportional to the specific mass m/z of the particles and to the square $\omega^2$ of the RF frequency $\omega$. There is a lower mass threshold for the reflection of the particles.

The relatively easily manufactured surface, made of a grid of parallel wires, already has a very short range pseudopotential. The RF field of a grid with wires of 0.1 millimeter, one millimeter apart, falls to 5% in one millimeter, to 0.2% in two millimeters and to 0.009% in three millimeters. The pseudopotential, which is proportional to the square of this field, falls off much more quickly: At a distance of one millimeter, there is a pseudopotential of only 0.25%.

The ions are stored in these new measuring cells in the form of a fine ion string with no magnetron motion. Owing to their kinetic energy, the ions can move to and fro in the axial direction in the ion string; they undergo hard reflection at each of the trapping electrodes, and the slightly scattering reflection leads to minuscule cyclotron helical movements of the ions. The ion strings as a whole can now be excited via suitable chirp or sync pulses so that they perform a cyclotron circular motion. In the orbiting ion string, the scattering effect of the reflections also decreases, so that the diameter of the ion string only increases very slowly. These long ion strings can consist of significantly more ions than previous measuring cells without the space charge adversely affecting the cyclotron circular motion. The space charge also allows the diameter of the ion string to increase only very slowly.

SUMMARY OF THE INVENTION

The invention provides a measuring cell whose trapping electrodes at the ends of the measuring cell consist of fine structural elements, adjacent structural elements each being connected to different phases of an RF voltage, thus generating repelling pseudopotentials and facilitating a cyclotron motion of the ions without magnetron motion. The measuring cell also contains a plurality of detection electrodes, which produce a multiple of the measured frequency of the image currents in the time domain compared to the cyclotron frequency. This increases the mass resolution and the mass accuracy. A measuring cell according to this invention may have structural elements of the trapping electrodes comprising fine parallel wires.

In this type of cell, the formation of a fine ion string for ions having the same specific mass prevents the space charge from expanding the ion string too quickly in radial direction. If the fine structural elements of the trapping electrodes are favorably designed, the diameter of the ion string only increases slowly, even with the reflections at the trapping electrodes, so that the fine string is preserved over a longer period of time than is the case with earlier measuring cells. The lack of magnetron motion then makes it possible for this fine ion string to be brought closer to the detection electrodes than would have been possible in measuring cells with magnetron motion.

The measuring cells with many longitudinal electrodes arranged to form a sliced cylinder can be operated in various ways. It is possible, in a cell with 24 longitudinal electrodes, to use twelve electrodes for the measurement, six electrodes for one measuring pole and six for the opposite measuring pole, for example. Two sets of three electrodes are used for the dipolar excitation of the ions and two sets of three electrodes stay permanently grounded.

It is also possible to switch the electrodes. It is thus possible, for example, to operate a measuring cell with 16 electrodes so that, first of all, two sets of four electrodes positioned opposite each other are used for the excitation and then, after switching, all 16 electrodes are used for measuring the cyclotron motion, eight interconnected electrodes being connected to one input of the amplifier, and the eight lying in between these being connected to the other input.

It is advisable to bring the changeover switches as close as possible to the measuring cell. The changeover switches must also have a very low capacitance to prevent crosstalk of the image currents and to minimize detection losses.

The frequency of the RF voltage across the trapping electrodes must be far above the measuring frequency for the ion orbits. Frequencies of 15 to 20 megahertz are favorable here. The crosstalk of these RF voltages onto the detection electrodes can be minimized by suitable design of the fine structures of the trapping electrodes.

BRIEF DESCRIPTION OF THE DRAWINGS

The above and further advantages of the invention may be better understood by referring to the following description in conjunction with the accompanying drawings in which.

DETAILED DESCRIPTION

Figure 1:
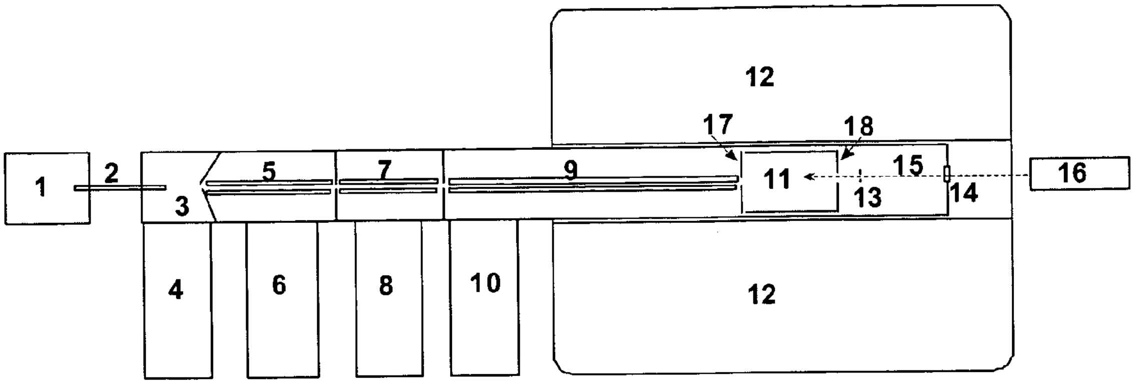
FIG. 1 shows the schematic arrangement of a conventional Fourier transform mass spectrometer with a measuring cell (11) in a magnet (12) with a superconductive coil.

The operation and function of an ion cyclotron resonance mass spectrometer can be explained in more detail with the help of FIG. 1. The ions are, for example, generated by electrospray ionization in an out-of-vacuum ion source (1) and introduced together with ambient gas through a capillary (2) into the first stage (3) of a differential pump system, which comprises the chambers (3), (5), (7) and (9) and is evacuated by the pumps (4), (6), (8) and (10). The ions are collected by the ion guides (5), (7) and (9) and guided to the measuring cell (11), where they are confined. The measuring cell (11) usually consists of four longitudinal electrodes arranged to form a sliced cylinder and of two trapping electrodes (17) and (18), each having a central aperture. The measuring cell is located in the homogeneous region of a strong magnetic field generated by superconductive coils in a helium cryostat (12) and has a magnetic field strength of high constancy. Electrons can be generated by a thermionic cathode (13) and introduced into the measuring cell in order to bring about a fragmentation of biopolymer ions by electron capture (ECD). A laser (16) can send an infrared laser beam (15) through a window (14) into the measuring cell to fragment ions by infrared multiphoton dissociation (IRMPD).

Figure 2:
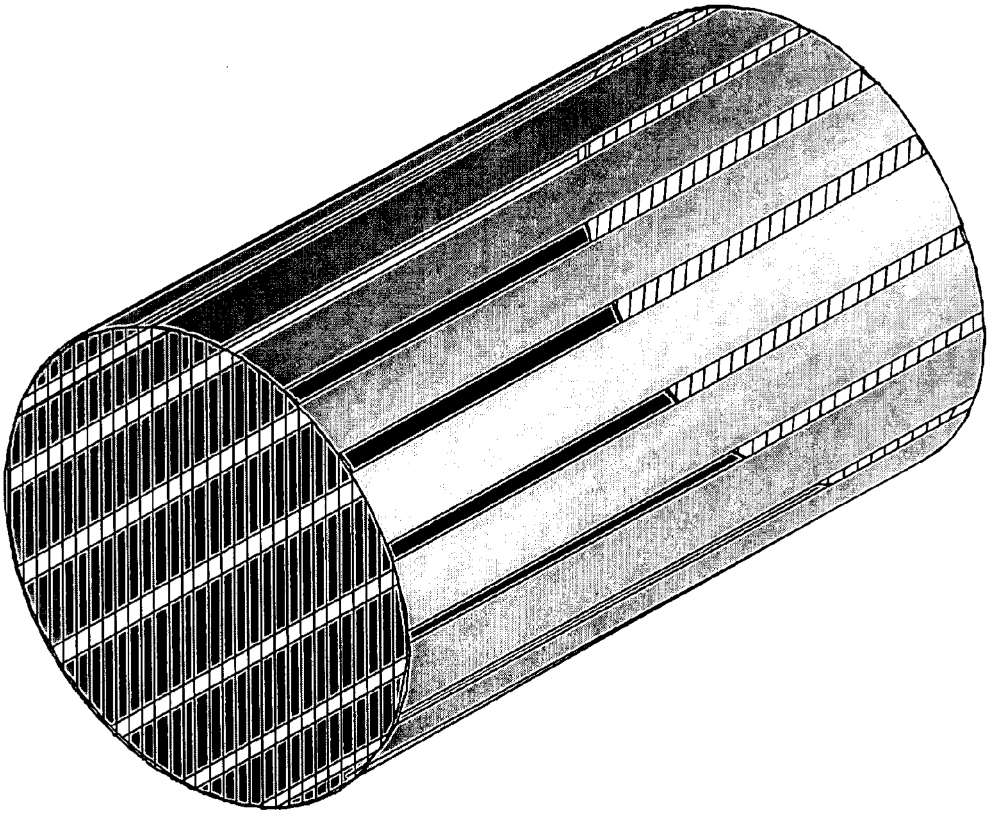
FIG. 2 shows the principle of a cylindrical measuring cell according to this invention with a grid structure for the trapping electrodes at the ends, and sixteen longitudinal electrodes. The measuring cell is shown purely schematically without any insulating holders for the longitudinal electrodes and the trapping grids and without any electrical terminals.
Figure 4:
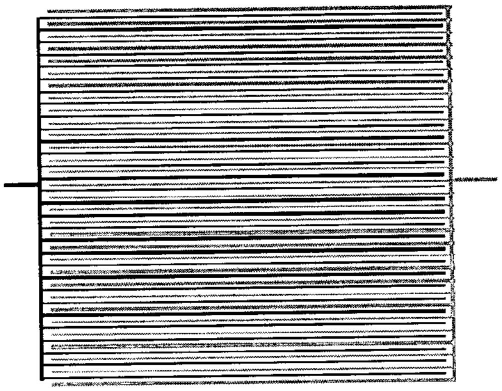
FIG. 4 is a schematic representation of a grid structure drawn as a square for the trapping electrodes with terminals for the RF voltage.
Figure 5:
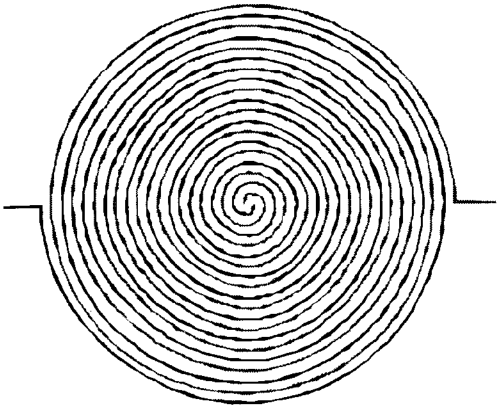
FIG. 5 shows a spiral grid structure for the trapping electrodes.
Figure 6:
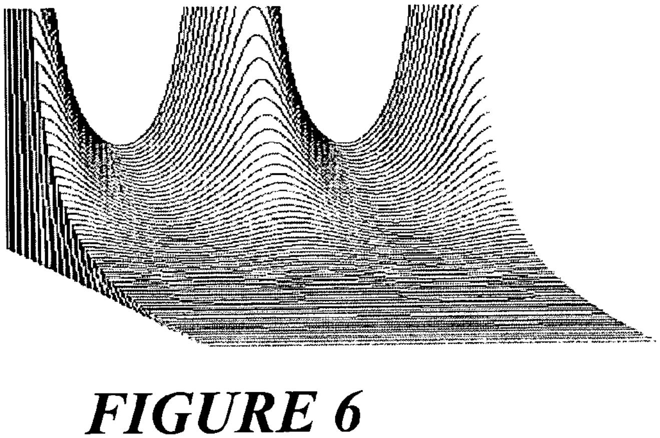
FIG. 6 shows the repelling pseudopotential of three wires from a grid structure with the potential saddles in between. The pseudopotential resembles a mountain range with mountain passes (potential saddles) between high mountains.

According to the invention, the usual measuring cell (11) is replaced with a measuring cell which, as schematically represented in FIG. 2, has many longitudinal electrodes arranged like a sliced sleeve around the cylindrical interior, and has trapping electrodes at both ends consisting of fine structural elements connected to RF voltage. In FIG. 2, a wire grid is used. The RF grid is configured in such a way that every other wire of the grid is connected to one phase of the RF voltage, and the wires in between to the other phase, as represented by the principle of the square grid in FIG. 4 or the spiral grid in FIG. 5. Overall, this results in a repelling pseudopotential which acts on ions of both polarities, as described in detail in U.S. Pat. No. 5,572,035. A pseudopotential of this type is shown in FIG. 6 for the vicinity of three wires. The pseudopotential has transition saddles, shaped like a mountain pass, between the wires, which can be used to fill the measuring cell.

The wires here are preferably arranged so that their capacitive crosstalk onto the detection electrodes is minimal. This can be achieved by having suitable distances between the individual grid elements and the detection electrodes, and particularly by having the same number of wires coming close to the two phases of a detection electrode in each case.

Figure 3:
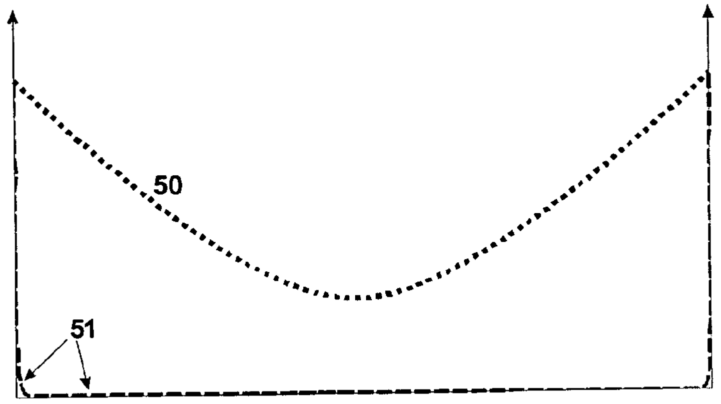
FIG. 3 depicts the potential well profile in the axis of measuring cells of various designs: Curve (50) is valid for current measuring cells with DC voltage trapping electrodes, curve (51) for RF trapping electrodes.

The action of the RF trapping electrodes results in the electrical potential distribution in the measuring cell being completely different to that found in conventional measuring cells. In a conventional measuring cell, there is a parabolic potential distribution along the axis, as in curve (50) of FIG. 3, and much more complicated potential distributions outside the axis, with a saddle point in the center of the measuring cell. In contrast, there are practically no potential differences within the measuring cell according to the invention. As curve (51) in FIG. 3 illustrates, there is only a pseudopotential with a very short range, directly in front of the trapping electrodes.

Figure 7:
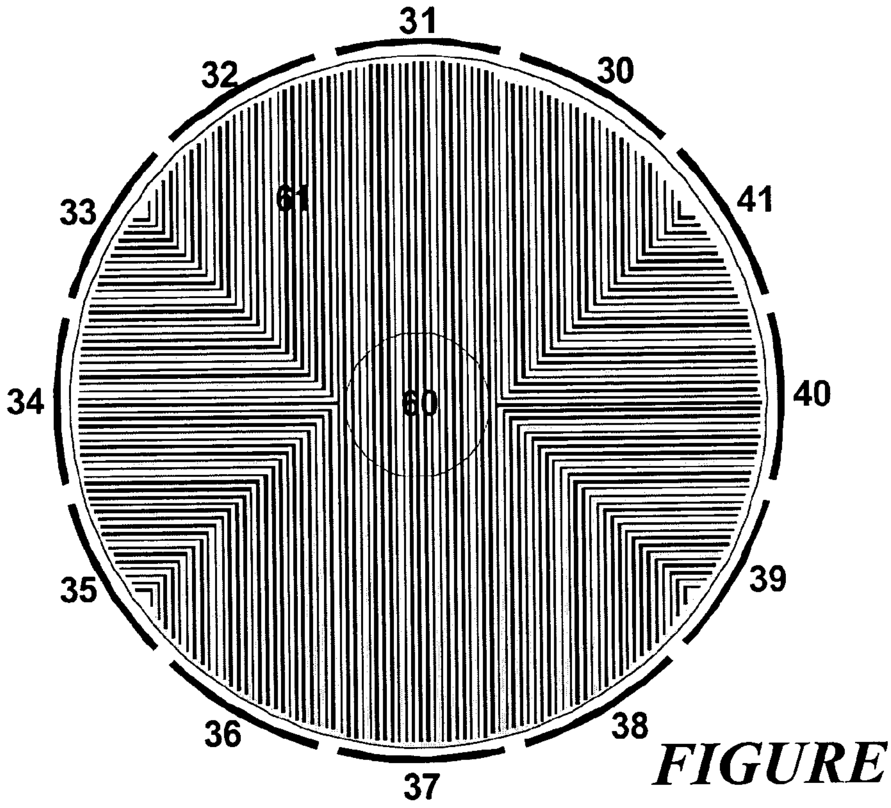
FIG. 7 represents an electronic ceramic board onto which a grid structure is printed, a central aperture being bridged by soldered wires. The central aperture is used to introduce the ions.

In the simplest case, the RF grid of the trapping electrodes is simply printed onto a ceramic disk, analogously to the technology for printed circuit boards or the technology for microfabrication, as shown in FIG. 7. In the central aperture, which preferably has a diameter of four to six millimeters, the printed wires of the board can be bridged by very thin, freely suspended real wires, which are soldered onto the board. For this purpose, the ceramic board can be equipped with very fine holes for mounting and soldering the real wires. The printed and the real wires can preferably be 0.1 millimeters thick and 0.5 millimeters apart. It is also possible to have other thicknesses and spacings, however. The thickness of the wires can range from 0.02 to 0.5 millimeters, and the spacing can range from 0.1 to 1 millimeter.

Instead of the ceramic board, a board made of special glass or high-vacuum-resistant plastic material can also be used. Instead of the wire grid it is also possible to utilize more complex electrode structures, as described in U.S. Pat. No. 5,572,035, for example an array of tips, or mixtures of tip electrodes and a meshed grid, with one tip in each mesh.

With RF frequencies of a few megahertz and voltages of a few tens of volts, pseudopotential barriers of a few volts are generated between the wires of a wire grid. This is sufficient to be able to confine the ions. At reduced voltages, the ions can be injected as a fine ion string across the potential saddle between the wires and into the axis of the measuring cell with low kinetic energies of only a few electron-volts (eV).

The longitudinal electrodes can be used for two purposes in succession, first for the excitation of the ions by chirp or sync pulses, and then for the detection. This requires that the terminals are connected after the excitation. The switchover times are not critical. It is sufficient if they are in the order of milliseconds. This means that both electronic changeover units and mechanical changeover switches are suitable.

In FIG. 7, the electrodes (30), (31) and (32), when interconnected, can carry one polarity of the bipolar excitation pulse, while the electrodes (36), (37) and (38) carry the other polarity, for example. The electrodes (33), (34), (35), (39), (40) and (41) are connected to ground. For the detection, on the other hand, the electrodes (30), (32), (34), (36), (38) and (40) together are connected at one input of the amplifier, while the other electrodes are connected at the other input. Compared with a normal operating mode with only two detection electrodes, a six-fold frequency is measured here.

Figure 8:
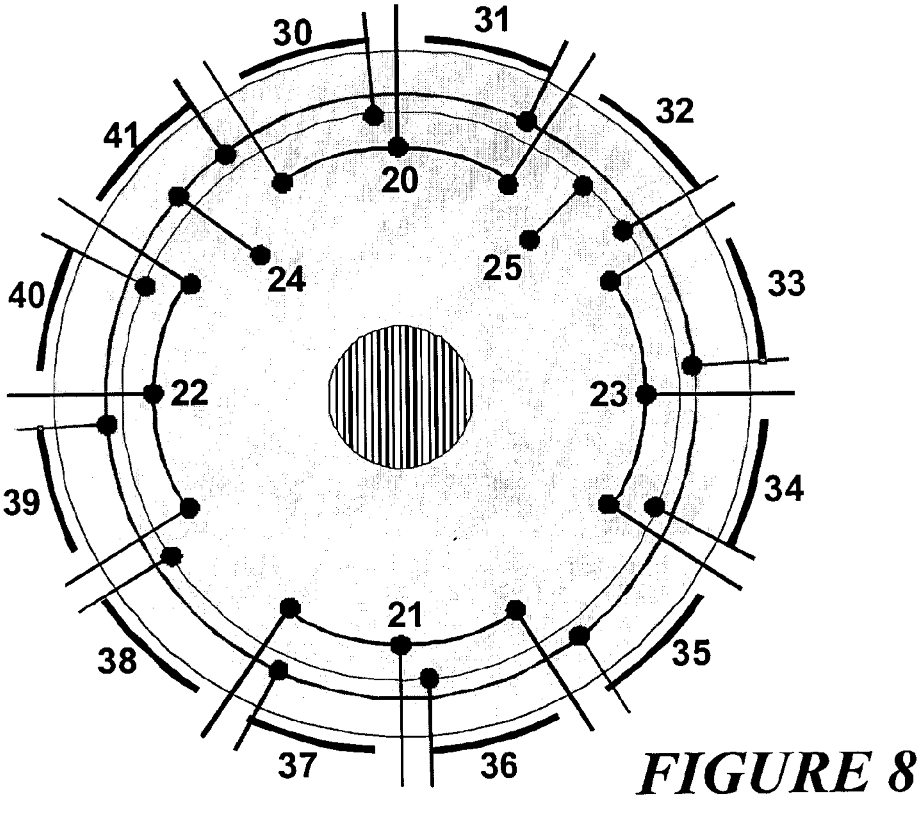
FIG. 8 shows the reverse of a ceramic board, which also simultaneously serves to switch the connections to the longitudinal electrodes. Switching between the excitation configuration and the detection configuration is performed by slightly turning the board.

The switching operation can be carried out by slightly turning the trapping electrode itself, for example, if this is equipped on the rear with suitable spring contacts and connections, as shown in FIG. 8. The terminals (24) and (25) are connected to the amplifier for the image currents, the terminals (20) and (21) to the generator for the excitation pulses. The trapping electrode can be turned mechanically by a longish tube from a position outside the magnetic field, but also pneumatically or hydraulically. A particularly interesting method of turning can be achieved, utilizing the strong magnetic field, by means of a coil mounted on the board, which turns the board because of the Lorentz force. It is advantageous here to let the final positions of the board click into place slightly and to switch off the current again at the coils in order not to produce a lasting disturbance of the magnetic field in the measuring cell.

Switching does not have to be done via mechanical contacts; it is also possible to use electronic switching. The electronic changeover unit should, however, be located in very close proximity to the longitudinal electrodes in order to minimize the crosstalk and scattering capacitances of the supply leads. This means the electronic switches must be located in the magnetic field, which restricts the choice of types of transistor.

Figure 9:
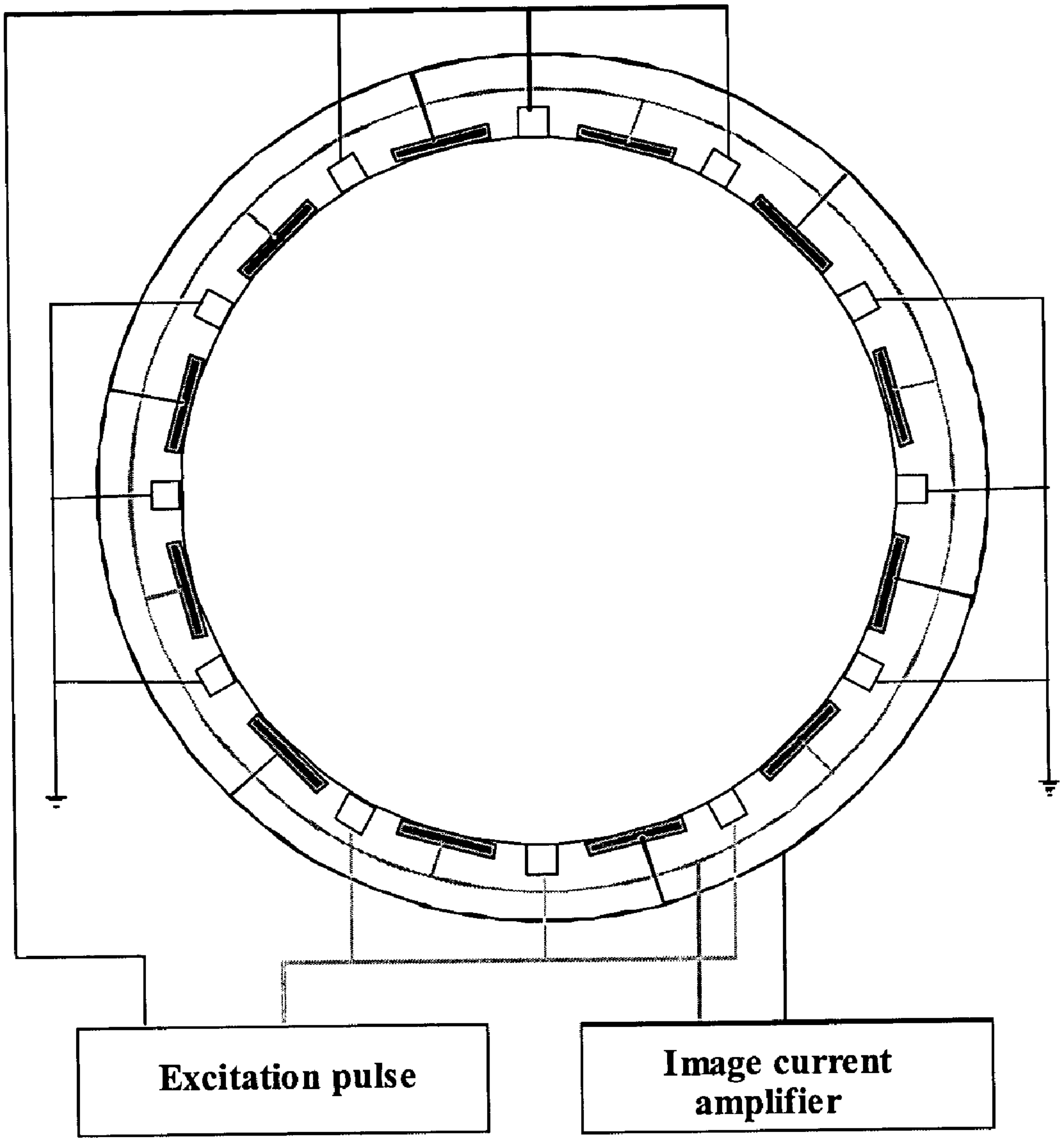
FIG. 9 represents the principle of a measuring cell which contains sufficient longitudinal electrodes to make switching unnecessary.

If more longitudinal electrodes are used than are required for the detection, operation is also possible without switching, as illustrated in FIG. 9 with an array with 24 longitudinal electrodes. This does, however, require approximately ten times higher excitation voltages because the potential distribution of the excitation pulses in the interior of the cell is no longer as favorable.

The excitation of the ion beam by excitation electrodes to produce cyclotron motion does, however, have one disadvantage with the current design of the measuring cell. Owing to the trapping electrodes, which are connected to RF voltage, there is a mean potential which corresponds to the ground potential. This means that the excitation pulses generate a potential distribution across the excitation electrodes in the interior of the measuring cell, and this potential distribution is not the same in every cross-section through the measuring cell, but varies in the axial direction and practically disappears in front of the trapping electrodes. For trapping electrodes connected to a DC voltage, an arrangement known as an "infinity cell" was elucidated a long time ago (DE 39 14 838 C2; M. Allemann and P. Caravatti). This arrangement divides the trapping electrodes into fields, to which attenuated excitation pulses are applied so as to simulate the effect of infinitely long excitation electrodes. The fields simulate the potential distribution which is present in the central cross-section of the measuring cell as a result of the excitation pulses.

Figure 10:
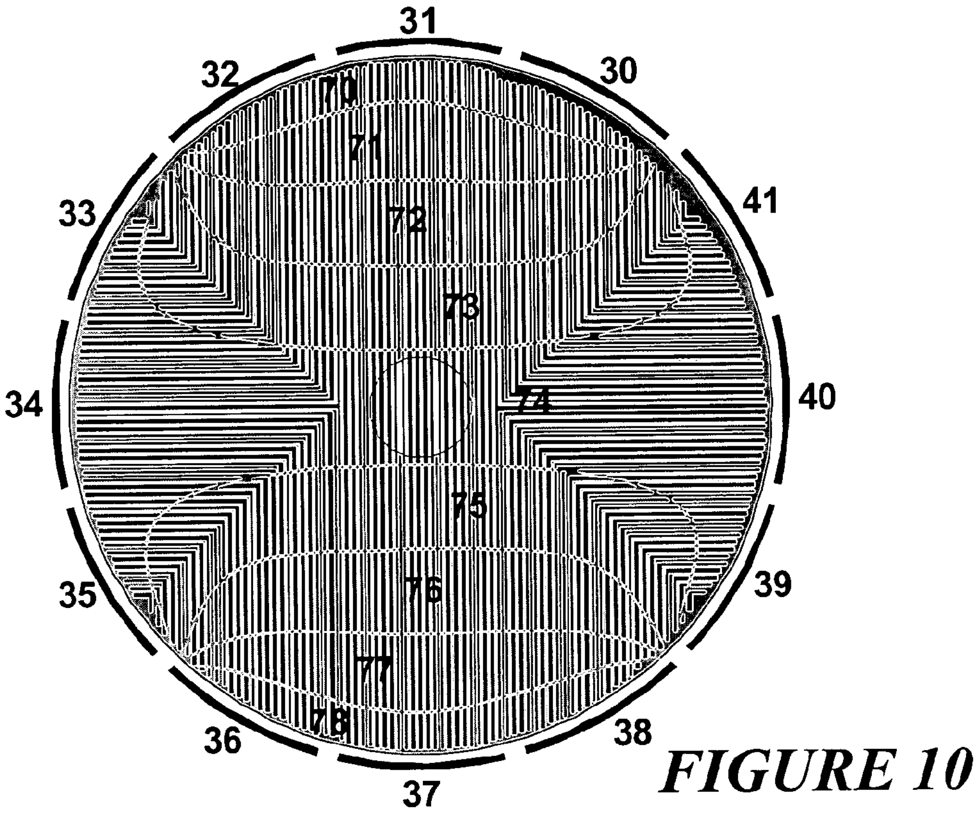
FIG. 10 reproduces a subdivision of the grid of the trapping electrodes. In addition to the trapping RF voltage, the individual fields can also be charged with stepwise attenuated excitation pulses in order to simulate the effect of infinitely long excitation electrodes ("infinity cell")

An arrangement like this can also be introduced for the RF grids of the trapping electrodes, as can be seen from FIG. 10. Superimpositions of the trapping RF voltage with the stepwise attenuated excitation pulses are now applied to the individual fields (70) to (78). Without excitation pulses, the normal trapping RF is present. The stepwise attenuated excitation pulses can be generated by capacitative voltage dividers. The fields can easily be produced by board etching techniques. They are equipped with electrical lead wires from the reverse side by means of fine plated-through holes. The ends of the wire conductor paths at the field boundaries are best connected crosswise in order to maintain a uniformly distributed pseudopotential in front of the grid.

This form of cyclotron resonance excitation with a potential distribution which is as constant as possible in every cross-section through the measuring cell is particularly important here because the ion string extends from one trapping electrode to the other and should preferably be excited along its whole length as is the case with the cyclotron circular movements. If the excitations are not uniform over the length of the measuring cell, the ion string is widened radially to form a ribbon which no longer induces maximum voltages in the detection electrodes. Moreover, the ribbon of ions can begin to rotate under the effect of the space charge, which worsens the image current signals even further.

Figure 11:
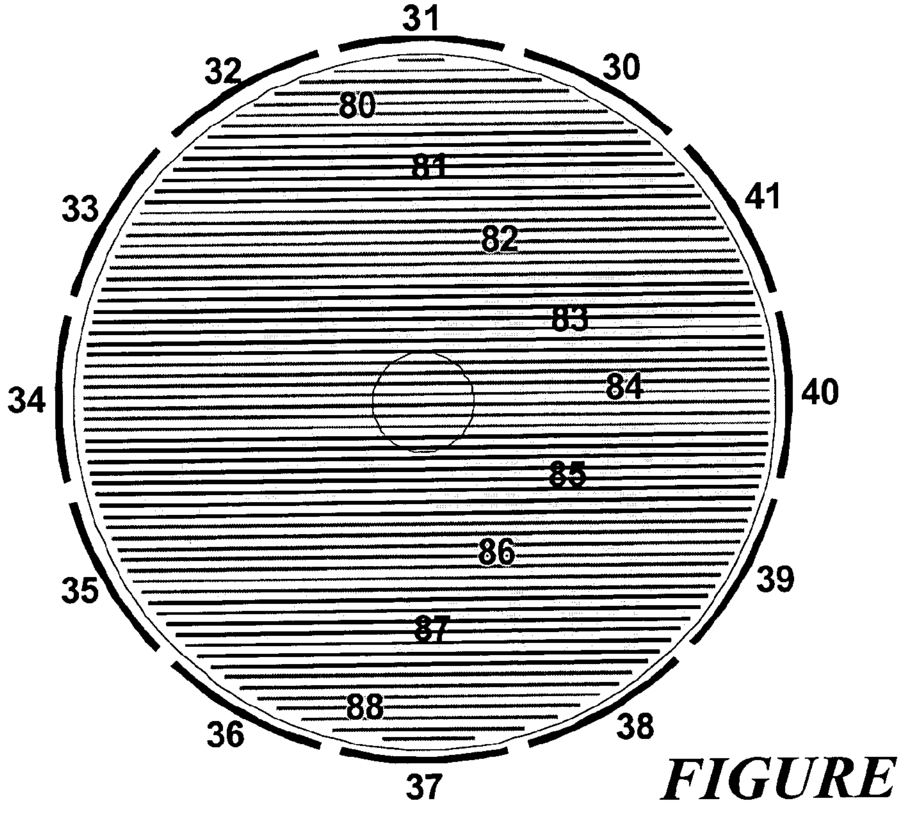
FIG. 11 illustrates an approximate subdivision of transverse grid fields for the same purpose, but only roughly approximated.

A simplified arrangement, but one which produces a similar effect, is depicted in FIG. 11. Here, the stepwise attenuated excitation pulses are applied to the parallel grid fields (80) to (88), and the trapping RF voltages are superimposed onto each one.

In a magnetic field of seven Tesla, the cyclotron frequency of a singly-charged ion with a mass of 1000 unified atomic mass units (termed Dalton below) is 107 kilohertz. If ions with specific masses of between 100 and 3000 Daltons per elementary charge are to be measured, then the cyclotron frequencies cover the range from 35 kilohertz up to around one megahertz. Measuring the image currents at sixteen longitudinal electrodes increases the measured frequency eightfold, i.e. it covers the range from 270 kilohertz to 8 megahertz. This frequency range has to be amplified and digitized.

The cyclotron frequencies in stronger magnetic fields of 9.4 or 12 Tesla are correspondingly higher.

In order that the frequency of the trapping electrodes, which affects the detection electrodes regardless of how much care is taken in their design, can be removed by suitable filtering, the trapping RF must lie above the measuring frequencies to be amplified. On the other hand, it must be as low as possible because the pseudopotentials decrease in inverse proportion to the square of the frequency. This results in a trapping RF of at least 10 to 20 megahertz.

A measuring cell according to the invention has the following advantages:

- a desired resolution is achieved in a much shorter measuring time; or, in the same measuring time, a significantly higher mass resolution power and a significantly improved mass accuracy is achieved,
- no magnetron motion is generated, and therefore the pure cyclotron frequency of the ions can be measured,
- the measuring cell can scan and measure positive and negative ions simultaneously, their cyclotron circular movements being in opposite directions,
- the measuring cell has a far higher scanning capacity for ions before space charge phenomena exert an influence on the cyclotron frequency.

The operation of a mass spectrometer with a measuring cell according to the invention does not differ greatly from the operation of a conventional measuring cell. Almost any of the processes used until now can be used as the filling process if the trapping RF voltage applied to the trapping electrodes is temporarily replaced with a DC voltage. In this case, however, the filling is restricted to ions of only a single polarity. A magnetron motion of the ions disappears if, after the filling, the DC voltage is, in turn, replaced with a trapping RF voltage applied to the structural elements of the trapping electrodes.

The measuring cell can also be filled through the structures of the trapping electrodes if a trapping RF voltage is applied. This filling process is, in fact, simpler. While the RF voltage applied to the trapping electrode opposite the ion input is kept at the same value, the voltage at the input side is reduced. Many ions from the ion beam, which is injected perpendicular to the trapping electrodes at a low energy of around 1.5 to 3 electron-volts, can then pass the pseudopotential saddle between the wires. As they pass through, they usually experience a slight lateral deflection which forces them to execute a tiny cyclotron helical motion with a minuscule diameter. At the same time, part of the kinetic energy in the forward direction is converted into kinetic energy of helical motion. During the return from the reflecting electrode on the rear of the measuring cell, it is precisely this helical motion which prevents the ions from overcoming the pseudopotential saddle in the backward direction; they are thus confined.

A particularly favorable method for filling the measuring cell is possible if the ions can be held temporarily in a store outside the magnetic field. This type of intermediate storage can be carried out in section (7) of the ion guide in FIG. 1, for example. For the filling, the ions from the intermediate storage are sent in the direction of the measuring cell with a kinetic energy of 1.5 to 3 electron-volts. This causes them to separate according to their specific mass because the lighter ions fly faster. When the lightest ions have entered the measuring cell, the trapping RF voltage is continuously increased in such a way that the pseudopotential, which acts in inverse proportion to the specific mass of the ions, remains constant for the ions which are arriving. The ions which entered the cell previously, which are lighter, can then no longer escape from the measuring cell. This filling process is very effective and simple.

Modern FTMS instruments are normally equipped with out-of-vacuum ion sources (1) such as electrospray ionization (ESI), chemical ionization at atmospheric pressure (APCI), photo ionization at atmospheric pressure (APPI) or matrix-assisted laser desorption at atmospheric pressure (AP-MALDI). The ions are introduced together with clean ambient gas through a suitable capillary (2) into the vacuum of the mass spectrometer. Guided by ion guides (5), (7) and (9), the ions are then separated from the ambient gas in several differential pump stages. In most cases, one of the stages of the ion guide, for example stage (7), is designed as a quadrupole filter, which is able to select ions of a specific mass (or a small mass range), all other ions being removed by orbital instabilities in the RF quadrupole field. Such instruments are abbreviated to QFTMS. The quadrupole filter makes it possible to specifically fill the measuring cell with ions of one specific mass, or with the isotope group of the ions of one substance.

Ions selected in this way can then be fragmented in the measuring cell into so-called daughter ions. These daughter ions provide information about internal structures of the ions. The amino acid sequences of proteins or peptides can be determined in this way, for example.

In modern FTMS instruments, two different methods are available for the fragmentation in the measuring cell, and these methods can also be used in the measuring cell according to the invention: so-called electron capture dissociation (ECD) and infrared multiphoton dissociation (IRMPD). Both types of fragmentation operate without any collision gas, and therefore do not disturb the functioning of the measuring cell, and are particularly effective for doubly-charged ions. For negatively-charged ions, fragmentation by electron detachment (EDD=electron detachment dissociation) is also an option.

IRMPD is brought about in the measuring cell by irradiation with infrared light (15) from an infrared laser (16) through a window (14) in the vacuum wall. The infrared radiation enters the measuring cell through the aperture in the trapping electrodes. The ions must not be in cyclotron circular motion, and therefore the fragmentation is carried out before the excitation of the ions. The ions absorb portions of energy by photon absorption until they finally decompose by separation of the bonds with low bond energies. The spectra are similar to those obtained through low-energy collisionally induced dissociation (CID).

Electron capture (ECD) is a completely different fragmentation process. This type of fragmentation is limited to biopolymers, particularly to proteins and peptides. If doubly charged (or polycharged) biopolymers, as are primarily generated by electrospray ionization, capture an electron, this occurs at a point where a proton is adhering. This point of the biopolymer spine is split by the neutralization energy without other points being changed. Only low-energy electrons may be offered here since only they lead to the desired type of fragmentation. The particular advantage of this fragmentation is that primarily so-called c-fragmentations occur, which make it relatively easy to read off the amino acid sequence.

The low-energy electrons are usually generated by a thermionic cathode; the weakly accelerated electrons then drift along the magnetic field lines to the cloud of ions. This type of electron generation can also be used in the measuring cell according to the invention. The speed of the low-energy electrons also (around three electron-volts) is already so high that they can meander through the structural elements of the trapping electrodes in the zero phases of the trapping RF voltage. The admission windows around the zero phases are relatively wide, since even relatively high electric transverse fields between the wires only lead to minuscule cyclotron helical motion of the electrons with diameters of a few micrometers. The high magnetic field keeps the electrons very stably on a trajectory along the field lines.

Low-energy electrons can also be generated by irradiating the structural elements of the trapping electrodes with UV laser beams.

One method of operating an ion cyclotron resonance mass spectrometer with a measuring cell according to this invention can look like this:

a) a strong homogeneous magnetic field is provided, b) the measuring cell according to the invention is provided in the magnetic field, c) the structural elements of the trapping electrodes are supplied with RF voltage, d) the measuring cell is filled with a predetermined quantity of ions, e) the longitudinal electrodes of the measuring cell are switched to an excitation of the ions, f) the ions are excited to cyclotron circular motion by excitation pulses with a mixture of frequencies, g) the longitudinal electrodes are switched to measure the image currents, h) the image currents, which are generated in the detection electrodes by the circulating ions of the various specific charges, are amplified and digitized, i) the digitized measurements of the time domain are transformed by Fourier transformation into the frequency domain, and j) the frequencies of the ion signals are converted into masses.

This method is but one of several methods which are possible, as became clear during the description of the possible designs of the new measuring cell. For example, instead of switching the longitudinal electrodes, it is also possible to choose an arrangement with fixed connections, although higher excitation voltages have to be applied. In this case, steps (e) and (g) can be skipped.

With knowledge of the invention, those skilled in the art can design further forms of the measuring cell and the methods it makes possible for their own special measurement task.

What is claimed is:

1. Measuring cell for an ion cyclotron resonance mass spectrometer, comprising a) end-standing trapping electrodes consisting each of fine structural elements, adjacent structural elements being connected to different phases of a trapping RF voltage, and b) at least four longitudinal electrodes for the measurement of the image currents.

2. Measuring cell according to claim 1, wherein the trapping electrodes comprise fine grids made up of real or printed wires, adjacent wires being connected to different phases of the trapping RF voltage.

3. Measuring cell according to claim 1, with at least four longitudinal electrodes and a switch which can switch the longitudinal electrodes from a mode for exciting the ions to cyclotron motion to a measuring mode for the image currents.

4. Measuring cell according to claim 3, with eight, twelve or sixteen longitudinal electrodes.

5. Measuring cell according to claim 1, with at least eight longitudinal electrodes, of which at least four are used solely for detection and at least two longitudinal electrodes positioned opposite each other are used solely to excite the ions to cyclotron motion.

6. Measuring cell according to claim 1, wherein the structural elements of the trapping electrodes are printed to ceramic, glass, or plastic boards, and wherein a central aperture is spanned by self-supporting real wires.

7. Measuring cell according to claim 6, wherein the structural elements of the trapping electrodes are divided into fields which roughly can reproduce the potential distribution generated by the excitation electrodes in the central cross-section of the measuring cell, and wherein these electrode fields are charged with mixtures of trapping RF voltages and stepwise attenuated excitation pulses in such a way that the electric excitation fields in the measuring cell are as similar as possible in every cross-section through the measuring cell.

8. An ion cyclotron resonance mass spectrometer, wherein it contains a measuring cell according to claim 1.

9. Ion cyclotron resonance mass spectrometer according to claim 8, wherein the RF voltage across the trapping electrodes can be temporarily replaced with DC voltages.

10. Ion cyclotron resonance mass spectrometer according to claim 8, wherein it incorporates an electron source for the generation of low-energy electrons.

11. Ion cyclotron resonance mass spectrometer according to claim 8, wherein it incorporates an infrared laser for a multiphoton dissociation.

* * * * *